US012032095B2

(12) United States Patent
McGuire (10) Patent No.: US 12,032,095 B2
(45) Date of Patent: Jul. 9, 2024

(54) DYNAMIC RANGE IMPROVEMENTS IN LIDAR APPLICATIONS

(71) Applicant: Sense Photonics, Inc., Durham, NC (US)

(72) Inventor: Kristopher McGuire, Raleigh, NC (US)

(73) Assignee: Sense Photonics, Inc., Durham, NC (US)

(*) Notice: Subject to any disclaimer, the term of this patent is extended or adjusted under 35 U.S.C. 154(b) by 793 days.

(21) Appl. No.: 16/821,441

(22) Filed: Mar. 17, 2020

(65) Prior Publication Data
US 2020/0300978 A1 Sep. 24, 2020

Related U.S. Application Data

(60) Provisional application No. 62/819,889, filed on Mar. 18, 2019.

(51) Int. Cl.
*G01S 7/481* (2006.01)
*G01S 7/484* (2006.01)
*G01S 7/4865* (2020.01)
*G01S 17/10* (2020.01)

(52) U.S. Cl.
CPC ........... *G01S 7/4816* (2013.01); *G01S 7/484* (2013.01); *G01S 7/4865* (2013.01); *G01S 17/10* (2013.01)

(58) Field of Classification Search
CPC ............................ G01S 7/4865; G01S 7/4816
See application file for complete search history.

(56) References Cited

U.S. PATENT DOCUMENTS

| 2015/0260843 | A1 | 9/2015 | Lewis |
| 2016/0266253 | A1* | 9/2016 | Kubota .................. G01S 7/497 |
| 2016/0363669 | A1* | 12/2016 | Liu ........................ G01S 7/4815 |
| 2018/0329065 | A1* | 11/2018 | Pacala .................. H01L 31/107 |
| 2019/0041522 | A1 | 2/2019 | Slutsky et al. |
| 2019/0079166 | A1 | 3/2019 | Kim et al. |
| 2020/0072946 | A1 | 3/2020 | Fisher et al. |

FOREIGN PATENT DOCUMENTS

KR 10-2018-0115799 10/2018

OTHER PUBLICATIONS

International Search Report and the Written Opinion of the International Searching Authority corresponding to International Patent Application No. PCT/US2020/023109 (12 pages) (dated Jul. 10, 2020).

* cited by examiner

*Primary Examiner* — Minh Q Phan
(74) *Attorney, Agent, or Firm* — Kilpatrick Townsend & Stockton LLP (57) ABSTRACT

A LIDAR system includes a detector array comprising a first detector region and a second detector region, wherein the first detector region comprises a first detector and the second detector region comprises a second detector, at least one optical element configured to separate light received at the at least one optical element into a first portion and a second portion, incident on the first detector and the second detector, respectively, wherein the at least one optical element is configured to alter a characteristic of the light, and a circuit configured to receive a first detection signal from the first detector responsive to the first portion of the light that is incident thereon and a second detection signal from the second detector responsive to the second portion of the light that is incident thereon, and to generate an improved signal based on the first and second detection signals.

18 Claims, 4 Drawing Sheets

DYNAMIC RANGE IMPROVEMENTS IN LIDAR APPLICATIONS

CLAIM OF PRIORITY

This application claims priority from U.S. Provisional Patent Application No. 62/819,889 entitled "DYNAMIC RANGE IMPROVEMENTS IN LIDAR APPLICATIONS" filed Mar. 18, 2019, the entire contents of which are incorporated by reference herein.

FIELD

The present disclosure is directed to Light Detection and Ranging (LIDAR) systems, and more particularly, to methods and devices to increase dynamic range in time-of-flight LIDAR systems.

BACKGROUND

Time of flight (ToF) based imaging is used in a number of applications including range finding, depth profiling, and 3D imaging (e.g., Light Detection And Ranging (LIDAR)). ToF 3D imaging systems can be categorized as indirect ToF or direct ToF systems. Direct ToF measurement includes directly measuring the length of time between emitting radiation by an emitter element of a LIDAR system, and sensing the radiation after reflection from an object or other target by a detector element of the LIDAR system. From this, the distance to the target can be determined. In specific applications, the sensing of the reflected radiation may be performed using a detector array of single-photon detectors, such as a Single Photon Avalanche Diode (SPAD) detector array. SPAD detector arrays may be used as solid-state detectors in imaging applications where high sensitivity and timing resolution are desired.

A SPAD is based on a p-n junction device biased beyond its breakdown region, for example, by or in response to a strobe signal having a desired pulse width. The high reverse bias voltage generates a sufficient magnitude of electric field such that a single charge carrier introduced into the depletion layer of the device can cause a self-sustaining avalanche via impact ionization. The avalanche is quenched by a quench circuit, either actively or passively, to allow the device to be "reset" to detect further photons. The initiating charge carrier can be photo-electrically generated by means of a single incident photon striking the high field region. It is this feature which gives rise to the name 'Single Photon Avalanche Diode'. This single photon detection mode of operation is often referred to as 'Geiger Mode'.

SUMMARY

Some embodiments described herein are directed to LIDAR systems, and more particularly, to methods and devices to increase dynamic range in time-of-flight LIDAR systems.

According to some embodiments, a LIDAR system includes a first detector region comprising a first detector, a second detector region comprising a second detector, and at least one optical element configured to receive incoming light and separate the incoming light into a first portion and a second portion. The at least one optical element may be configured to direct the first portion of light to be incident on the first detector and the second portion of light to be incident on the second detector, and the at least one optical element is configured to alter the incoming light such that a characteristic of the first portion of light is different from the second portion of light.

In some embodiments, the LIDAR system further includes a control circuit configured to receive a first detection signal from the first detector responsive to the first portion of the light that is incident thereon and a second detection signal from the second detector responsive to the second portion of the light that is incident thereon, and to generate an improved signal based on the first and second detection signals.

In some embodiments, wherein the control circuit is further configured to generate the improved signal based on determining that the first detector is saturated and, responsive thereto, preferentially using the second detection signal from the second detector to generate the improved signal.

In some embodiments, the improved signal has an increased dynamic range with respect to the first detection signal.

In some embodiments, the characteristic of the light is an intensity of the light.

In some embodiments, the second portion of light has an intensity that is less than the first portion of light.

In some embodiments, the first detector and the second detector are within a detector array, and the second detector region is located at a peripheral portion of the detector array.

In some embodiments, the at least one optical element comprises a neutral density filter.

In some embodiments, the first detector and/or the second detector is a Single Photon Avalanche Diode (SPAD).

According to some embodiments, a LIDAR system includes a detector array comprising a first detector region and a second detector region, wherein the first detector region comprises a first detector and the second detector region comprises a second detector, at least one optical element configured to separate light into a first portion and a second portion, incident on the first detector and the second detector, respectively, wherein the at least one optical element is configured to alter a characteristic of the light, and a circuit configured to receive a first detection signal from the first detector responsive to the first portion of the light that is incident thereon and a second detection signal from the second detector responsive to the second portion of the light that is incident thereon, and to generate an improved signal based on the first and second detection signals.

In some embodiments, the characteristic of the light is an intensity of the light.

In some embodiments, the second portion has an intensity that is less than the first portion.

In some embodiments, the second detector region is located at a peripheral portion of the detector array.

In some embodiments, the improved signal has an increased dynamic range with respect to the first detection signal.

In some embodiments, the at least one optical element comprises a neutral density filter.

In some embodiments, the LIDAR system further includes comprising an optical emitter, and wherein the light separated by the at least one optical element comprises light emitted by the optical emitter and reflected by a target.

In some embodiments, the at least one optical element is configured to attenuate the light into the first portion having a first intensity and the second portion having a second intensity, different than the first intensity.

In some embodiments, the first detector and/or the second detector is a Single Photon Avalanche Diode (SPAD).

According to some embodiments, a method of operating a LIDAR system includes receiving light at a detector array of the LIDAR system, the detector array comprising a first detector region and a second detector region, wherein the first detector region comprises a first detector and the second detector region comprises a second detector, separating the light into a first portion and a second portion, wherein the second portion has at least one characteristic that is different from the first portion, directing the first portion of the light onto the first detector, directing the second portion of the light onto the second detector, and generating an improved signal based on a first detection signal from the first detector and a second detection signal from the second detector.

In some embodiments, the at least one characteristic of the light comprises an intensity of the light.

In some embodiments, the second portion has an intensity that is less than the first portion.

In some embodiments, the second detector region is located at a peripheral portion of the detector array.

In some embodiments, the improved signal has an increased dynamic range with respect to the first detection signal.

In some embodiments, separating the light into the first portion and the second portion is performed by at least one optical element comprising a neutral density filter.

In some embodiments, the at least one optical element is configured to attenuate the light into the first portion having a first intensity and the second portion having a second intensity, different than the first intensity.

In some embodiments, the first detector and/or the second detector is a Single Photon Avalanche Diode (SPAD).

In some embodiments, generating the improved signal comprises determining that the first detector is saturated and, responsive thereto, preferentially using the second detection signal from the second detector to generate the improved signal.

BRIEF DESCRIPTION OF THE DRAWINGS

The present invention will become more apparent in view of the attached drawings and accompanying detailed description in which the same reference numerals or the same reference designators denote the same elements throughout the specification.

DETAILED DESCRIPTION

Embodiments of the present disclosure are described herein with reference to lidar applications and systems. A lidar system may include an array of emitters and an array of detectors, or a system having a single emitter and an array of detectors, or a system having an array of emitters and a single detector. As described herein, one or more emitters may define an emitter unit, and one or more detectors may define a detector pixel. A flash lidar system may acquire images by emitting light from an array, or a subset of the array, of emitter elements for short durations (pulses) over a field of view (FOV) or scene. A non-flash or scanning lidar system may generate image frames by raster scanning light emission (continuously) over a field of view or scene, for example, using a point scan or line scan to emit the necessary power per point and sequentially scan to reconstruct the full field of view FOV.

Figure 1A:
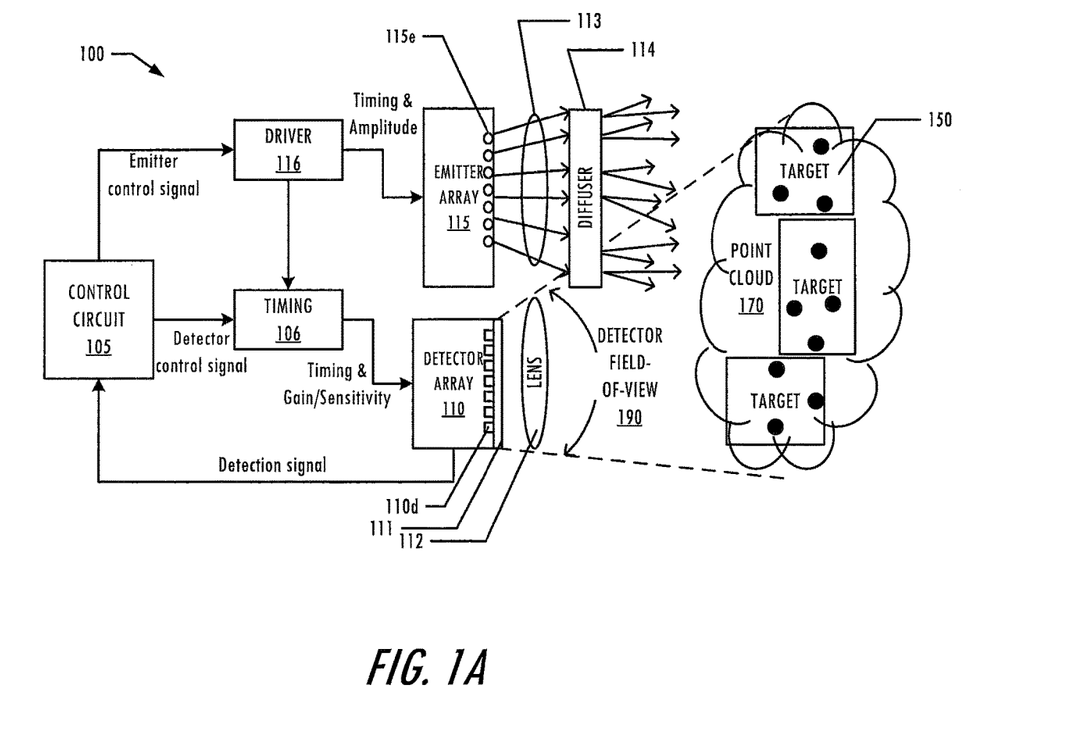
FIG. 1A is a block diagram illustrating an example lidar system or circuit in accordance with some embodiments of the present disclosure.

An example of a ToF measurement system or circuit 100 in a LIDAR application that may operate in accordance with embodiments of the present disclosure is shown in FIG. 1A. The system or circuit 100 includes a control circuit 105, a timing circuit 106, an emitter array 115 including a plurality of emitters 115e, and a detector array 110 including a plurality of detectors 110d. The detectors 110d include time-of-flight sensors (for example, an array of single-photon detectors, such as SPADs). One or more of the emitter elements 115e of the emitter array 115 may define emitter units that respectively emit optical illumination pulses or continuous wave signals (generally referred to herein as optical signals or emitter signals) at a time and frequency controlled by a timing generator or driver circuit 116. In particular embodiments, the emitters 115e may be pulsed light sources, such as LEDs or lasers (such as vertical cavity surface emitting lasers (VCSELs)). The optical signals are reflected back from a target 150, and sensed by detector pixels defined by one or more detector elements 110d of the detector array 110. The control circuit 105 may implement a pixel processor that measures and/or calculates the time of flight of the illumination pulse over the journey from emitter array 115 to target 150 and back to the detectors 110d of the detector array 110, using direct or indirect ToF measurement techniques.

In some embodiments, an emitter module or circuit 115 may include an array of emitter elements 115e (e.g., VCSELs), a corresponding array of optical elements 113,114 coupled to one or more of the emitter elements (e.g., lens(es) 113, such as microlens(es) and/or diffusers 114), and/or driver electronics 116. The optical elements 113, 114 may be optional, and can be configured to provide a sufficiently low beam divergence of the light output from the emitter elements 115e so as to ensure that fields of illumination of either individual or groups of emitter elements 115e do not significantly overlap, and yet provide a sufficiently large beam divergence of the light output from the emitter elements 115e to provide eye safety to observers.

The driver electronics 116 may each correspond to one or more emitter elements, and may each be operated responsive to timing control signals with reference to a master clock and/or power control signals that control the peak power of the light output by the emitter elements 115e, for example, by controlling the peak drive current to the emitter elements 115e. In some embodiments, each of the emitter elements 115e in the emitter array 115 is connected to and controlled by a respective driver circuit 116. In other embodiments, respective groups of emitter elements 115e in the emitter array 115 (e.g., emitter elements 115e in spatial proximity to each other), may be connected to a same driver circuit 116. The driver circuit or circuitry 116 may include one or more driver transistors configured to control the modulation frequency, timing, and/or amplitude/power level of the optical signals that are output from the emitters 115e.

In some embodiments, a receiver/detector module or circuit 110 includes an array of detector pixels (with each detector pixel including one or more detectors 110d, e.g., SPADs), receiver optics 112 (e.g., one or more lenses to collect light over the FOV 190), and receiver electronics (including timing circuit 106) that are configured to power, enable, and disable all or parts of the detector array 110 and to provide timing signals thereto. The detector pixels can be activated or deactivated with at least nanosecond precision, and may be individually addressable, addressable by group, and/or globally addressable. The receiver optics 112 may include one or more macro lens(es) that are configured to collect light from the largest FOV that can be imaged by the lidar system, microlenses to improve the collection efficiency of the detecting pixels, and/or anti-reflective coating to reduce or prevent detection of stray light. In some embodiments, a spectral filter 111 may be provided to pass or allow passage of 'signal' light (i.e., light of wavelengths corresponding to those of the optical signals output from the emitters) but substantially reject or prevent passage of non-signal light (i.e., light of wavelengths different than the optical signals output from the emitters).

The detectors 110d of the detector array 110 are connected to the timing circuit 106. The timing circuit 106 may be phase-locked to the driver circuitry 116 of the emitter array 115. The sensitivity of each of the detectors 110d or of groups of detectors may be controlled. For example, when the detector elements include reverse-biased photodiodes, avalanche photodiodes (APD), PIN diodes, and/or Geiger-mode Avalanche Diodes (SPADs), the reverse bias may be adjusted, whereby, the higher the overbias, the higher the sensitivity. When the detector elements 110d include integrating devices such as a CCD, CMOS photogate, and/or photon mixing device (pmd), the charge integration time may be adjusted such that a longer integration time translates to higher sensitivity.

Light emission output from one or more of the emitters 115e impinges on and is reflected by one or more targets 150, and the reflected light is detected as an optical signal (also referred to herein as a return signal, echo signal, or echo) by one or more of the detectors 110d (e.g., via receiver optics 112), converted into an electrical signal representation (referred to herein as a detection signal), and processed (e.g., based on time of flight) to define a 3-D point cloud representation 170 of the field of view 190. Operations of lidar systems in accordance with embodiments of the present disclosure as described herein may be performed by one or more processors or controllers, such as the control circuit 105 of FIG. 1A.

Figure 1B:
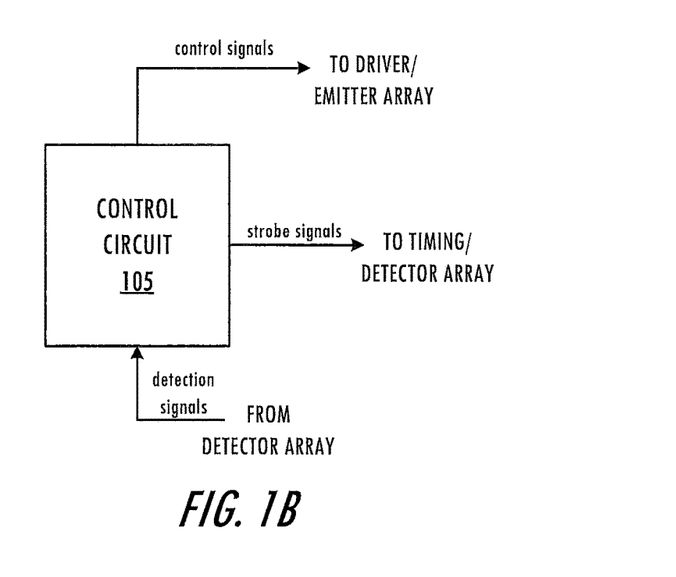
FIG. 1B is a block diagram illustrating the control circuit of FIG. 1A in greater detail in accordance with some embodiments of the present disclosure.

FIG. 1B illustrates the control circuit 105 in greater detail. The control circuit 105 may include one or more control circuits, for example, an emitter control circuit (also referred to as an emitter circuit) that is configured to provide the emitter control signals via the driver circuitry 116 of the emitter array 115, and/or a detector control circuit (also referred to as a detector circuit) that is configured to provide the detector control signals via the timing circuitry 106 of the detector array 110 as described herein. 'Strobing' as used herein may refer to the generation of control signals (also referred to herein as strobe signals or 'strobes') that control the timing and/or duration of activation (detection windows or strobe windows) of one or more detector pixels of the system or circuit 100. For example, the detector control signals output from the control circuit 105 may be provided to a variable delay line of the timing circuitry 106, which may generate and output the strobe signals with the appropriate timing delays to the detector array 110. The control circuit 105 is also configured to provide or control the generation of additional detector control signals (also referred to herein as subpixel control signals) that selectively activate individual detectors 110d in a pixel, to control the number of active detectors 110d within the pixel. The control circuit 105 may also include processing circuit that receives and processes the detection signals output from the detector array 110 to calculate the time of flight of an illumination pulse based thereon, and/or a sequencer circuit that is configured to coordinate operation of the emitters 115e and detectors 110d. More generally, the control circuit 105 may include one or more circuits that are configured to coordinate the timing and durations of operation of the emitters 115e and/or the detectors 110d (at the pixel level and/or at the individual detector level), e.g., for the respective strobe windows between the pulses of the optical signals from the emitters 115e, and/or to process the detection signals output from the detectors 110d in response.

As noted above, a detection window or strobe window may refer to the respective durations of activation and deactivation of one or more detector pixels (e.g., responsive to respective strobe signals from a control circuit) over the temporal period or time between pulses of the emitter(s) (which may likewise be responsive to respective emitter control signals from a control circuit). The time between pulses (which defines a laser cycle, or more generally emitter pulse frequency) may be selected or may otherwise correspond to a desired imaging distance range for the lidar system. The distance range may be shorter or equal to the distance traversed by light during the time between pulses of the optical signals. Each strobe window may be differently delayed relative to the emitter pulses, and thus may correspond to a respective portion or subrange of the distance range. Each strobe window may also correspond to a respective image acquisition subframe (or more particularly, point cloud acquisition subframe, generally referred to herein as a subframe) of an image frame. That is, each image frame includes a plurality of subframes, each of the subframes samples or collects data (e.g., as an accumulation of photons) for a respective strobe window over the temporal period, and each strobe window covers or corresponds to a respective distance subrange of the distance range. A subframe may be read out before moving the strobe window to a new distance range. Range measurements and strobe window subrange correspondence as described herein are based on time of flight of an emitted pulse.

As discussed herein, detector elements 110d may include SPADs that undergo an avalanche in response to detecting a photon, which may be subsequently quenched. While an avalanche in a SPAD is being quenched and the bias is being restored, the SPAD cannot detect photons. Photons that reach the SPAD 110d during this period are not counted. As the number of photons incident on the SPAD increases, the amount of time in which the SPAD is unable to detect additional photons may also increase. At this point the SPAD may begin to saturate. If the light level continues to increase, the SPAD may undergo avalanche as soon as bias is restored to the SPAD, and the count rate may be limited by the avalanche recovery time.

In situations where a given target contains bright lights and or highly reflective elements (also known as retroreflectors), the increased intensity of the bright light and/or the echo signal from the reflective surface may lead to saturation of the SPADs 110d of the detector array 110. With highly saturated images, obtaining the necessary information to estimate the phase background may be difficult due to inability and/or difficulty to accurately gauge the full intensity of the objects (e.g., the illumination of the objects by the emitter signal). Techniques to minimize and/or accommodate saturation and/or excessively intense signals may include additional processing and/or additional sampling intervals. Examples of such techniques are included in commonly-owned U.S. Patent Publication No. 2020/0072946 entitled "GLARE MITIGATION IN LIDAR APPLICATIONS," published on Mar. 5, 2020, to Fisher et al., the contents of which are incorporated by reference herein. In some embodiments, saturation may be addressed by using additional (e.g., two) exposure times within the ToF system, which may provide an increase in dynamic range.

Some embodiments of the present invention may arise from recognition that the dynamic range of a ToF system may be increased by utilizing additional detectors 110d in a detector array 110 (e.g., a SPAD array) to simultaneously sample arriving light at different intensity levels. In particular, embodiments described herein provide methods and related devices that are operable to separate incoming light into two or more component beams having different intensities such that different intensity levels of the light may be sampled by different respective SPAD detectors. In some embodiments additional SPAD detectors configured to sample the different intensity levels of light may be located in a physically separate SPAD array and/or on a physically separate portion of the ToF detector apparatus.

In some embodiments, incident light arriving at the detector (e.g., the echo signal) may be separated into a plurality of components, such as light portions and/or beams, some of which may be attenuated with respect to the original arriving light. For example, incident light arriving at the ToF detector apparatus may be separated into a first portion/beam having a first intensity (e.g., 90%) of the original light and a second portion/beam having a second intensity, lower than the first intensity (e.g., 10%), of the original light. The first portion/beam of the arriving light may be directed to one or more first SPAD detectors, and the second portion/beam of the arriving light may be directed to one or more second SPAD detectors. The ToF system may be configured to correlate the two portions of light (e.g., the detected photons at the first and second detectors) for comparison. In the event the first portion of light (e.g., at 90% of the intensity) results in saturation of the first detector, the second detector receiving the second portion of light may be utilized to determine an accurate intensity for the arriving light. Because the second portion of the light has been attenuated to a lower intensity than the first portion (e.g., 10% of the original intensity), the second detector has a higher (e.g., ten times higher) range and/or tolerance for saturation. For example, a level of light that saturates the first detector at 90% intensity may not saturate the second detector at 10% intensity.

By incorporating the signals from both the first detector and the second detector, a dynamic range of the ToF system may be increased. For example, a controller and/or circuit coupled to both the first detector and the second detector may determine that the first detector is saturated. Responsive to this determination, the controller and/or control circuit may use the output of the second detector either in addition to, or as an alternative to, the first detector. For example, in some embodiments, the controller and/or control circuit may calculate information (e.g., a target location) based on the second detector responsive to an indication of saturation at the first detector. In some embodiments, the calculation may take into account a scaling factor that may be used to adjust the information output from the second detector based on a known and/or determined attenuation of the light provided to the second detector.

In some embodiments, detectors on peripheral portions of the ToF system may be used. In some embodiments, the ToF system may have unused or sparsely used portions of the device that may be populated with additional detectors to increase the dynamic range of the ToF system. In some embodiments, for example, the field of view of the optics and emitter coverage may use approximately one-third of the total, active, pixelated sensor area of a ToF chip. Thus, a band of pixels centered on the ToF chip may be used to map a 100×22 degree field of view (e.g., a field of view having a horizontal range that covers 100 degrees a vertical range that covers 22 degrees). By utilizing the unused pixel bands above and below the active region through additional optics, additional data can be collected.

Figure 2:
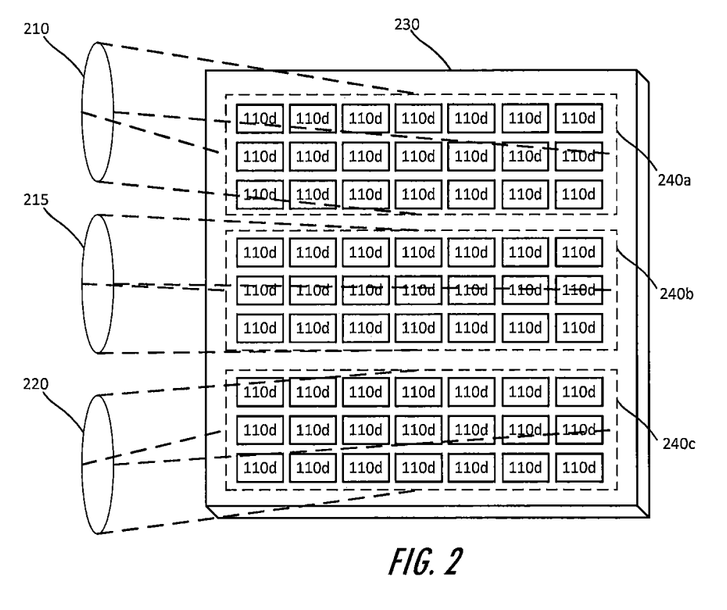
FIG. 2 illustrates an example optical system according to some embodiments described herein.

FIG. 2 illustrates an example optical system according to some embodiments described herein. FIG. 2 illustrates a ToF chip 230 associated with three optics sets including first optics set 210, second optics set 215, and third optics set 220 (also referred to herein as optical elements) to generate three portions of light as an example. The embodiments described herein are not limited to three optics sets, but can be any number of optics sets that can cover the ToF chip area with or without overlapping.

The ToF chip 230 may include a plurality of active regions. For example, the ToF chip 230 may include first active region 240a, second active region 240b, and third active region 240c. Each of the active regions 240a, 240b, 240c may include one or more detectors 110d. FIG. 2 illustrates an example of a plurality of detectors 110d in each of the active regions 240a, 240b, 240c, but the embodiments described herein are not limited to the configurations of detectors 110d illustrated in FIG. 2.

Different ones of the optics sets 210, 215, 220 may be configured to distribute incoming light to different ones of the active regions 240a, 240b, 240c. For example, first optics set 210 may be configured to direct incoming light to first active region 240a. Second optics set 215 may be configured to direct incoming light to second active region 240b. Third optics set 220 may be configured to direct incoming light to second active region 240c.

The use of multiple optics sets to map over the entire ToF chip 230 active area may increase the overall system dynamic range. Individual ones of the optics sets 210, 215, 220 can be fitted with mechanisms to alter characteristics of the light, such as appropriately rated neutral density filters, to accommodate various, slightly overlapping ranges of signal intensities to expand the dynamic range. As used herein, a neutral density filter includes filters that reduce or modify the intensity of all wavelengths, or colors, of light equally, giving no or negligible changes in other aspects of the light (e.g., color). This technique can also be used with the other approaches, such as that of taking data with different exposure times, to further expand the dynamic range.

In some embodiments, respective ones of the optics sets 210, 215, 220 may utilize a different type or kind of optical element. For example, a first optical element used within the first optics set 210 may be different from an optical element used within the second and/or third optics set 215, 220. Thus characteristics of light passing through the first optics set 210 may be different from characteristics of light passing through the second optics set 215 and/or the third optics set 220. For example, in some embodiments the first optics set 210, the second optics set 215, and the third optics set 220 may not affect the intensity of the light (e.g., for dim targets), but may alter other characteristics of the light (e.g., frequency).

Though three separate optics sets 210, 215, 220 are illustrated in FIG. 2, it will be understood that the embodiments described herein are not limited thereto. For example, in some embodiments, a plurality of optics sets may be incorporated into a single structure. For example, a single lens or lens element may be configured to separate incoming light into a plurality of light segments, with each of the light segments configured to be directed to a different active area (e.g., active regions 240a, 240b, 240c) on the ToF chip 230.

Figure 3:
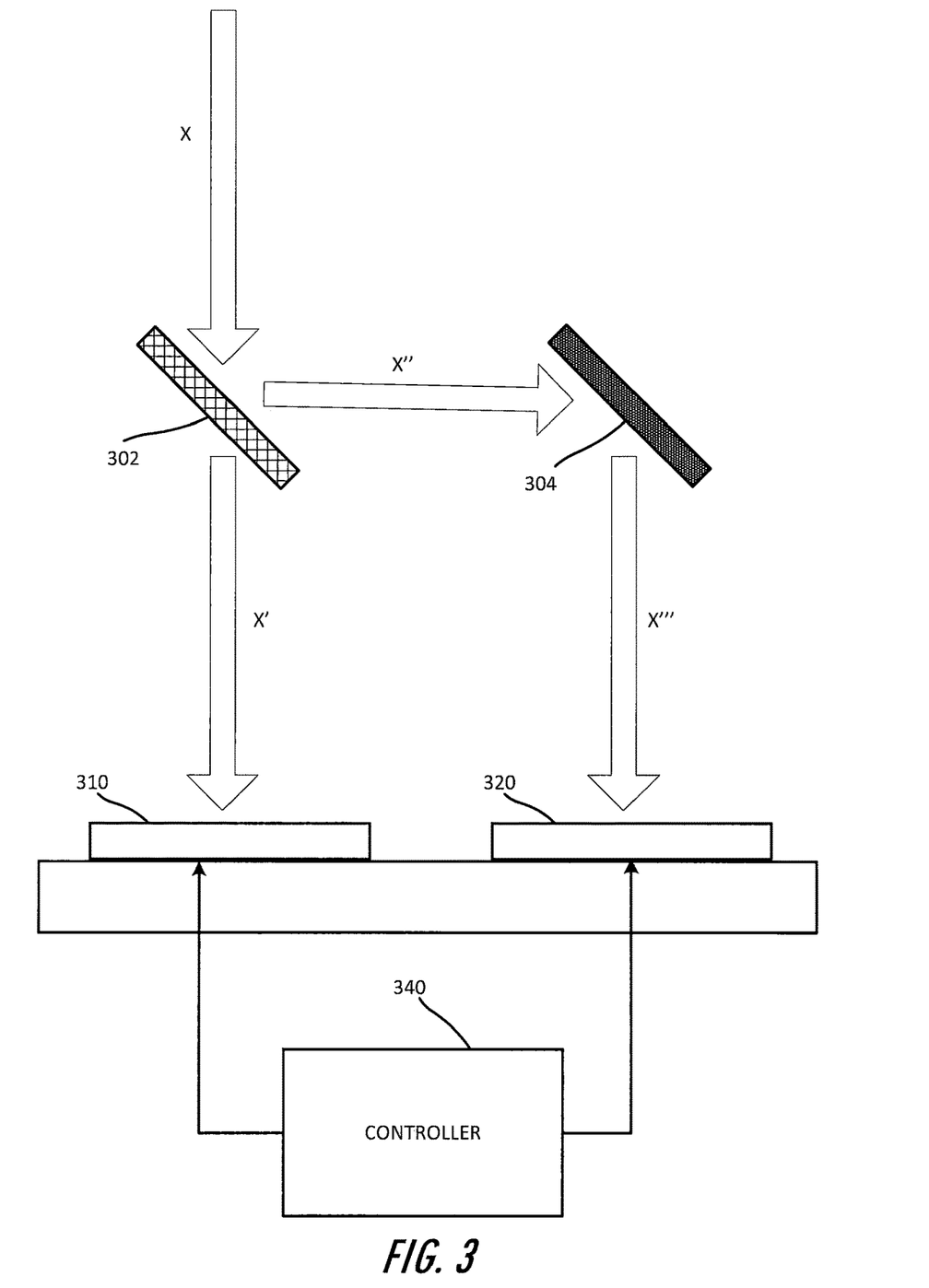
FIG. 3 illustrates an example of a beam splitter according to some embodiments described herein.

Examples of optical elements that may be used within the first optics set 210, the second optics set 215, and/or the third optics set 220 to separate the incoming light into multiple portions may include beam splitters. FIG. 3 illustrates an example of a beam splitter according to some embodiments described herein. In some embodiments, one or more elements of a beam splitter may include a neutral density filter to attenuate the incoming light.

As illustrated in FIG. 3, the arriving light X may be intercepted by a first optical element 302, such as a beam splitter including a neutral density (or other) filter. The arriving light X may be separated into a first portion X' and a second portion X" by the first optical element 302. The first portion X' may be directed to a first detector region 310, and the second portion X" may be directed to a second detector region 320. The first portion of light X' may have different characteristics from the incoming light X and the second portion of light X". For example, the first optical element may slightly attenuate the incoming light X so that the first portion of light X' is at 90% of the intensity of the incoming light X. The second portion of light X" may be at 10% of the intensity of the incoming light X. These changes are merely examples, and other changes to the characteristics of the incoming light X may be changed without deviating from the embodiments described herein. For example, in some embodiments, a frequency of the incoming light X may be separated (e.g., filtered) by the first optical element 302, such that the frequency components of the first portion of light X' are different from the incoming light X.

The first detector region 310 and/or the second detector region 320 may each include one more individual detectors (e.g., such as detectors 110d as illustrated in FIG. 1). In some embodiments, additional optical elements, such as beam splitters and/or reflectors, may be utilized. For example, in some embodiments a second optical element 304 may be used to separate the second portion of light X" into further portions of light (e.g., third portion X'") before being directed to the second detector region 320. In some embodiments, the second optical element 304 may reflect and/or otherwise direct the light onto a second detector region 320. In some embodiments, the different portions of light (e.g., X', X", X'") may have different characteristics (e.g., different intensities) though the embodiments described herein are not limited thereto. For example, the second portion of light X" and the third portion of light X'" may be substantially the same (e.g., in terms of color, intensity, etc.). As discussed with respect to the first optical element 302, the second optical element 304 may alter one or more characteristics of the light such that the third portion of light X'" may be different from the second portion of light X'.

In some embodiments, the first detector region 310 and the second detectors region 320 may be connected to a controller and/or control circuit 340 that is configured to associate a first portion of light received at one or more detectors of the first detector region 310 with a second portion of light received at one or more detectors of the second detector region 320. In some embodiments, by utilizing the differences between the first and second portions of light, the controller and/or control circuit 340 may increase a dynamic range of the detected light.

For example, the control circuit 340 may be configured to correlate the first portion of light X' and the third portion of light X'" received at the first detector region 310 and second detector region 320, respectively. In the event the first portion of light X' (e.g., at 90% of the intensity) results in saturation of the first detector region 310, the second detector region 320 receiving the third portion of light X'" may be utilized to determine an accurate intensity for the arriving light. Because the third portion of the light X'" has been attenuated to a lower intensity than the first portion of light X' (e.g., 10% of the original intensity), the second detector region 320 has a higher (e.g., ten times higher) range and/or tolerance for saturation.

For example, a level of light that saturates the first detector region 310 at 90% intensity may not saturate the second detector region 320 at 10% intensity. By incorporating the signals from both the first detector region 310 and the second detector region 320, a dynamic range of the ToF system may be increased. For example, in some embodiments, the controller and/or control circuit 340 may calculate information (e.g., a target location) based on the second detector region 320 responsive to an indication of saturation at one or more detectors of the first detector region 310. In some embodiments, the calculation may take into account a scaling factor that may be used to adjust the information received at the second detector region 320 based on a known and/or determined attenuation of the light provided to the second detector region 320.

In some embodiments, different ones of the optical elements may alter (e.g., attenuate) the incoming light X such that different ones of the first and second detector regions 310, 320 and/or detectors receive light of different characteristics. Though the discussion herein has mentioned altering an intensity of the light, it will be understood that other characteristics of the light may be changed. For example, the optical elements may alternatively or additionally alter the frequency and/or phase of the light.

Figure 4:
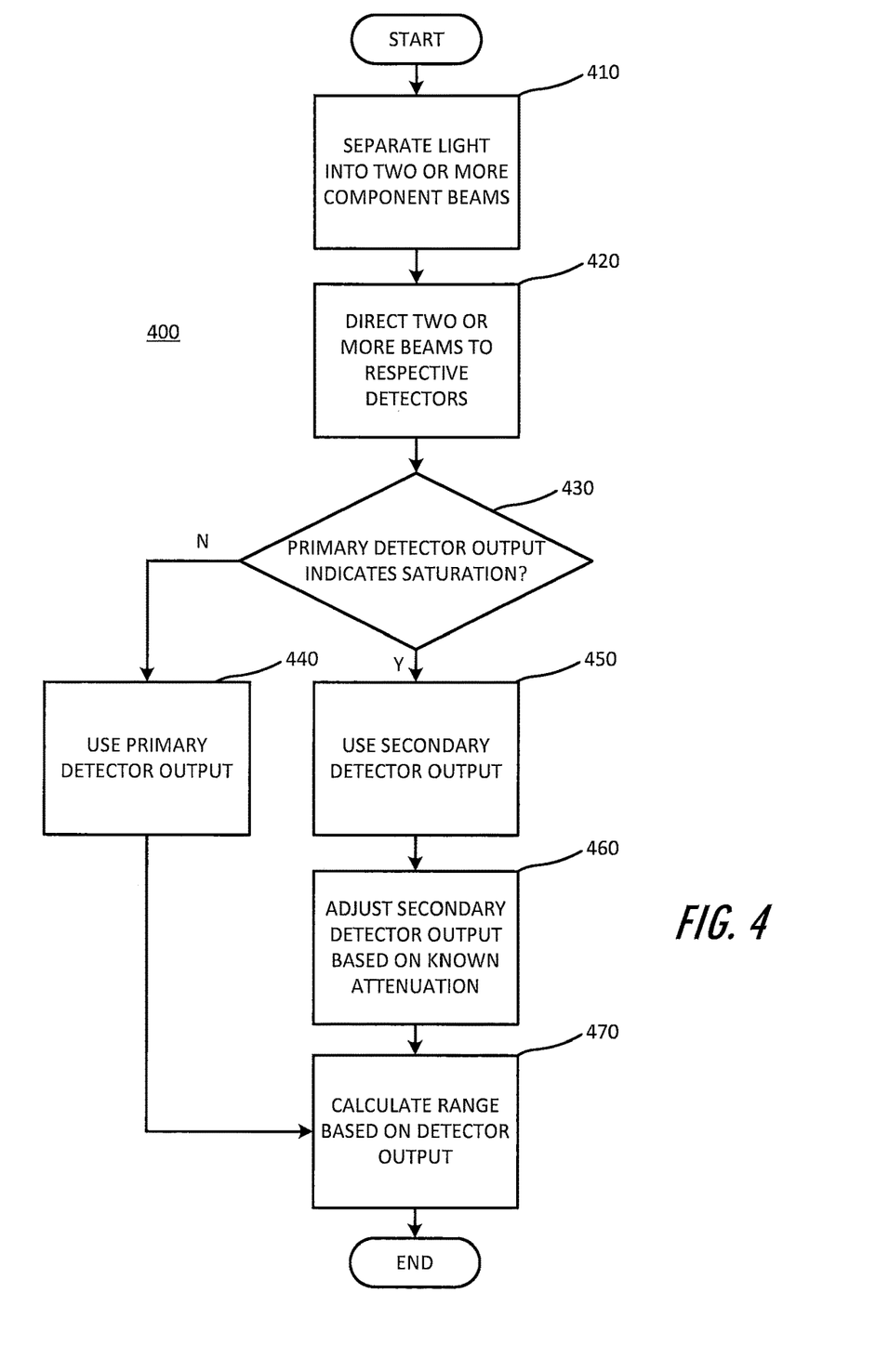
FIG. 4 illustrates a method to determine a range to a target according to some embodiments described herein.

FIG. 4 illustrates a method 400 to determine a range to a target according to some embodiments described herein. Referring to FIG. 4, the method 400 may include operation 410 in which incoming light is separated into two or more component beams. For example, as discussed herein, optical elements may be used to separate incoming light into multiple portions. In some embodiments, different ones of the portions of light may have different characteristics, such as different intensities, frequency, etc. For example, separating the light may include attenuating a portion of the light to reduce its intensity as compared to other portions of light. The optical elements may include, for example, optic sets, beam splitters, and/or filters.

In operation 420, the respective portions of light (e.g., beams) may be directed onto different detectors. For example a first portion of light may be directed to a primary detector and a second portion of light may be directed to a secondary detector. In embodiments in which the portions of light have different intensities, a portion of light directed to the primary detector may have a higher intensity than a portion of light directed to the secondary detector. In some embodiments, portions of light may be modified to attenuate characteristics associated with detector saturation.

In operation 430, output of the primary detector may be monitored for an indication that it is saturated. For example, a ratio of a dead time for a SPAD after undergoing avalanche may be monitored.

If the primary detector is not indicated as being saturated ("N" in operation 430), the output from the primary detector (e.g., detection signals in response to photons from the received portion of light) may be used in operation 440. In a ToF system, the output from the primary detector may be used to determine a range to an object from which the portion of light was reflected in operation 470.

If the primary detector is indicated as being saturated ("Y" in operation 430), the output from the secondary detector may be preferentially used in operation 450. Though FIG. 4 illustrates that either the output from the primary detector is used or the output from the secondary detector is used, the embodiments described herein are not limited thereto. In some embodiments, responsive to indicating that the primary detector is saturated, the output from both the primary and secondary detectors may be used.

When the output from the secondary detector is used, it may be adjusted, or results determined from the output may be adjusted, in operation 460. For example, in cases where the portion of light has been attenuated (e.g., its intensity has been reduced), the output may be scaled and/or adjusted to account for the attenuation. Operation 460 may be optional in some embodiments. In a ToF system, the output from the second detector may subsequently be used to determine a range to an object from which the portion of light was reflected in operation 470.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "some embodiments," "one embodiment," and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts. The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

It will be understood that when an element is referred to or illustrated as being "on," "connected," or "coupled" to another element, it can be directly on, connected, or coupled to the other element, or intervening elements may be present. In contrast, when an element is referred to as being "directly on," "directly connected," or "directly coupled" to another element, there are no intervening elements present.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, the regions illustrated in the figures are schematic in nature and their shapes are not intended to illustrate the actual shape of a region of a device and are not intended to limit the scope of the invention.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entireties.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

Although the invention has been described herein with reference to various embodiments, it will be appreciated that further variations and modifications may be made within the scope and spirit of the principles of the invention. Although specific terms are employed, they are used in a generic and descriptive sense only and not for purposes of limitation.

The invention claimed is:

1. A Light Detection and Ranging (LIDAR) system comprising:
   a first detector region comprising a first detector;
   a second detector region comprising a second detector;
   at least one optical element configured to receive incoming light and separate the incoming light into a first portion and a second portion, wherein the at least one optical element is configured to direct the first portion of light to be incident on the first detector and the second portion of light to be incident on the second detector and alter the incoming light such that a characteristic of the first portion of light is different from the second portion of light; and
   a control circuit configured to receive a first detection signal from the first detector responsive to the first portion of the light that is incident thereon and a second detection signal from the second detector responsive to the second portion of the light that is incident thereon, and to generate a third detection signal based on determining that the first detector is saturated and, responsive thereto, adjusting the second detection signal based on the characteristic to generate the third detection signal.

2. The LIDAR system of claim 1, wherein the improved third detection signal has an increased dynamic range with respect to the first detection signal.

3. The LIDAR system of claim 1, wherein the characteristic of the light is an intensity of the light, and wherein the at least one optical element is configured to direct the first portion of the light to be incident on the first detector and the second portion of the light to be incident on the second detector substantially simultaneously.

4. The LID AR system of claim 1, wherein the second portion of light has an intensity that is less than the first portion of light.

5. The LIDAR system of claim 1, wherein the first detector and the second detector are within a detector array, and wherein the second detector region is located at a peripheral portion of the detector array.

6. The LIDAR system of claim 1, wherein the at least one optical element comprises a neutral density filter.

7. The LIDAR system of claim 1, wherein the first detector and/or the second detector is a Single Photon Avalanche Diode (SPAD).

8. A Light Detection and Ranging (LIDAR) system comprising:
   a detector array comprising a first detector region and a second detector region, wherein the first detector region comprises a first plurality of detectors and the second detector region comprises a second plurality of detectors;
   at least one optical element configured to separate light into a first component beam incident on the first plurality of detectors in the first detector region at a first intensity level and a second component beam incident on the second plurality of detectors in the second detector region at a second intensity level lower than the first intensity level; and
   a controller coupled to the first plurality of detectors and the second plurality of detectors and configured to calculate distance to an object based on the second plurality of detectors if one or more detectors in the first plurality of detectors is saturated by the first component beam.

9. The LID AR system of claim 8, wherein the first component beam and the second component beam of light are incident on the first plurality of detectors and the second plurality of detectors, respectively, substantially simultaneously.

10. The LIDAR system of claim 8, wherein each of the first and second plurality of detectors comprises a plurality of single photon avalanche diodes (SPADs).

11. The LIDAR system of claim 8, wherein the second detector region is located at a peripheral portion of the detector array.

12. The LIDAR system of claim 8, wherein the system has an increased dynamic range with respect to the first plurality of detectors.

13. The LIDAR system of claim 8, further comprising an optical emitter, and wherein the light separated by the at least one optical element into first and second component beams comprises light emitted by the optical emitter and reflected by a target.

14. The LIDAR system of claim 8, wherein the at least one optical element is configured to attenuate the light to provide the first component beam having a first intensity and the second component beam having a second intensity, lower than the first intensity.

15. The LIDAR system of claim 8 wherein the controller includes a scaling factor based on a known or determined attenuation of the second component beam when calculating distance to the object when the first detection signal is saturated.

16. A method of operating a Light Detection and Ranging (LIDAR) system comprising:
   receiving light at a detector array of the LIDAR system, the detector array comprising a first detector region and a second detector region, wherein the first detector region comprises a first detector and the second detector region comprises a second detector;
   separating the light into a first portion and a second portion, wherein the second portion has at least one characteristic that is different from the first portion;
   directing the first portion of the light onto the first detector;
   directing the second portion of the light onto the second detector; and
   generating a third detection signal based on a first detection signal from the first detector and a second detection signal from the second detector, wherein generating the third detection signal comprises determining that the first detector is saturated and, responsive thereto, adjusting the second detection signal based on the at least one characteristic to generate the third detection signal.

17. The method of claim 16, wherein the at least one characteristic of the light comprises an intensity of the light, and wherein directing the first portion of the light onto the first detector and directing the second portion of the light onto the second detector is performed substantially simultaneously.

18. The method of claim 16, wherein the second portion has an intensity that is less than the first portion.

* * * * *